(12) United States Patent
Glaesemann et al.

(10) Patent No.: US 8,367,208 B2
(45) Date of Patent: Feb. 5, 2013

(54) DAMAGE RESISTANT CHEMICALLY-TOUGHENED PROTECTIVE COVER GLASS

(75) Inventors: Gregory Scott Glaesemann, Corning, NY (US); James Joseph Price, Corning, NY (US); Robert Sabia, Corning, NY (US); Nagaraja Shashidhar, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 411 days.

(21) Appl. No.: 12/367,185

(22) Filed: Feb. 6, 2009

(65) Prior Publication Data

US 2009/0202808 A1 Aug. 13, 2009

Related U.S. Application Data

(60) Provisional application No. 61/065,167, filed on Feb. 8, 2008.

(51) Int. Cl.
*B32B 17/00* (2006.01)
*C03C 3/083* (2006.01)
(52) U.S. Cl. .......... 428/410; 428/409; 428/426; 501/55; 501/65; 501/66; 501/68; 501/70; 501/72
(58) Field of Classification Search .................. 428/409, 428/410, 426, 428, 432; 501/55, 65, 66, 501/68, 70, 72
See application file for complete search history.

(56) References Cited

U.S. PATENT DOCUMENTS

| | | | |
|---|---|---|---|
| 6,333,285 B1 * | 12/2001 | Chopinet et al. | 501/69 |
| 2003/0091835 A1 | 5/2003 | Takahashi et al. | |
| 2004/0224834 A1 | 11/2004 | Kohli | |
| 2005/0090377 A1 | 4/2005 | Shelestak et al. | |
| 2005/0250639 A1 * | 11/2005 | Siebers et al. | 501/68 |
| 2006/0238100 A1 | 10/2006 | Miyata et al. | |
| 2008/0020919 A1 * | 1/2008 | Murata | 501/66 |
| 2008/0286548 A1 | 11/2008 | Ellison et al. | |
| 2009/0226671 A1 * | 9/2009 | Yanase et al. | 428/156 |

FOREIGN PATENT DOCUMENTS

WO WO 2007136054 * 11/2007

OTHER PUBLICATIONS

V. Le Houerou et al; "Surface damage of soda-lime-silica glasses: indentation scratch behavior"; J. Non-Crystalline Solids 316 (2003) 54-63.
P.H. Kobrin et al; "The effects of thin compressive films on indentation fracture toughness measurements"; J Materials Science 24 (1989) 1363-1367.
Rajan Tandon et al; "Indentation Behavior of Ion-Exchanged Glasses"; J. Am Ceram. Soc. 73 (4) 970-977 (1990).
Rajan Tandon et al; "Surface Stress Effects on Indentation Fracture Sequences"; J. Am Ceram. Soc. 73 (9) 2619-2627 (1990).

* cited by examiner

*Primary Examiner* — Jennifer McNeil
*Assistant Examiner* — Lauren Colgan
(74) *Attorney, Agent, or Firm* — Walter M. Douglas

(57) ABSTRACT

The invention is directed to a high strength, chemically toughened protective glass article, the glass article having a high damage tolerance threshold of at least 1500 g as measured by the lack of radial cracks when the load is applied to the glass using a Vickers indenter; preferably greater than 2000 g s measured by the lack of initiation of radial cracks when the load is applied to the glass using a Vickers indenter.

10 Claims, 7 Drawing Sheets

DAMAGE RESISTANT CHEMICALLY-TOUGHENED PROTECTIVE COVER GLASS

PRIORITY

This application claims the benefit and priority of U.S. Provisional Application No. 61/065,167 titled "DAMAGE RESISTANT, CHEMICALLY TOUGHENED PROTECTIVE COVER GLASS," which was filed on Feb. 8, 2008 in the name of inventors Gregory S. Glaesmann, James J. Price, Robert Sabia and Nagaraja Shashidhar.

FIELD

The invention is directed to protective glass covers, and in particular to chemically toughened, damage resistant glass covers suitable for use in electronic devices.

BACKGROUND

The use of mobile devices having larger displays is becoming more ubiquitous in devices such as cell phones, hand held games, MP3 players, watches, laptop computers, mobile GPS and other display screens in cars, touch panel screens, and other electronic devices without limitation. At least a portion of the cover plate is transparent, so as to allow the user to view a display. For some applications, the cover plate is sensitive to the user's touch. As the use of such devices increases the probability of the cover glass breaking or suffering damage due to accidents, cleaning negligent use and ordinary use also increases. The presently available cover glasses are not designed or selected to survive the high levels of abuse or some or the ordinary accident that can occur such as sharp contact or impact with another object. Due to frequent contact, such cover plates must have high strength and be scratch resistant.

The "selection criteria" for the existing glasses, though not always a requirement, has typically been limited to the following:

1. A minimum height that the glass will have to survive when a 135 g ball is dropped on the glass that is supported in a prescribed manner;
2. A minimum strength as measured by a four point bend test; and
3. A hardness which although measured is typically not a requirement.

These "criteria" for existing protective glass used in display devices are not well understood. Moreover, the primary test method for accepting cover glass as fit-for-use is a ball drop test, a test known to the inventors for its inability to accurately assess damage resistance of glass because it is sensitive to existing surface flaws and not to the introduction of new flaws. Strength testing, for example, immediately after ion exchange, has also been used as a predictor of the protective capability of cover glass. These tests will naturally lead one to value high surface compressive stress over a deep ion exchange layer. The inventors have found that this is incorrect and the opposite is actually true. Consequently, the present thin cover glass in these devices has not been optimized for glass and ion exchange properties that directly relate to abrasion resistance and visual appearance in these devices. For example, current soda lime silicate ("SLS") glass used in mobile devices is mechanically hindered by inherent limitations in its ion exchange capability.

The criteria described above has been applied to select glasses that are primarily in the soda-lime silicates family, including version in which the alumina content is elevated—referred to as aluminosilicates or modified-aluminosilicates. [United States Patent Application Publication 2008-0286548 A1 mentioned above discloses some glass compositions that are an improvement over cover glass formulations of the prior art]. We have found that these criteria do not describe actual failure modes observed in the field for these devices. The requirements defined by the prior art does not predict how much load the glass can withstand when the mobile device is dropped on a sharp object such a small stone. It also does not predict how the glass will survive after the mobile device has experienced in-service use with accumulated damage on the surface. The prior art requirements can result in parts with unacceptably poor strength and scratches. The present invention overcomes the difficulties present in glasses currently used as protective covers and/or touch screens in electronic devices.

SUMMARY

The invention is directed to a high strength, chemically toughened protective and/or interactive (e.g., a touch screen) glass article, the glass article having a high damage tolerance threshold of at least 1500 g as measured by the lack of the presence of radial cracks when the load is applied to the glass using a Vickers indenter. In one embodiment the high damage tolerance threshold of at least 2000 g. In one embodiment the high damage tolerance threshold of at least 4000 g. In another embodiment the high damage tolerance threshold of at least 6000 g.

In a further embodiment the high strength, chemically toughened protective glass article is transparent.

In an additional embodiment the high strength, chemically toughened protective glass article is opaque and/or non-transparent.

In one embodiment the invention is directed to a protective glass made of a soda lime glass, an alkali containing aluminosilicate glass, an alkali containing aluminoborosilicate glass, an alkali containing borosilicate glass or an alkali containing glass-ceramic that has been ion exchanged to have a high damage tolerance threshold of at least 2000 g as measured by the lack of the presence of radial cracks when the load is applied to the glass using a Vickers indenter. In one embodiment the high damage tolerance threshold of at least 4000 g. In another embodiment the high damage tolerance threshold of at least 6000 g.

The invention is also directed to a method of designing the ion-exchange parameters in thin glass articles for use as protective cover sheets, the method having the steps of:

choosing the depth of the compression layer required to achieve the desired level of damage resistance as measured by a Vickers indenter test and/or a scratch resistant test using a Knoop diamond indenter;

selecting the compressive stress that will allow a designed maximum tensile stress to develop in the center of the glass article; and diluting an ion-exchange bath containing alkali metal ions having a diameter larger than that of sodium ions with sodium ions to achieve the desired compressive stress.

The invention is also directed to a method of making a chemically strengthened glass article suitable for use as a protective cover glass the method having the steps of:

providing a glass sheet, the glass sheet being made of a glass selected from the group consisting of soda lime glass, an alkali containing aluminosilicate glass, an alkali containing aluminoborosilicate glass, an alkali containing borosilicate glass and alkali containing glass-ceramics;

chemically strengthening the glass sheet by ion-exchanging Na and/or Li ions in the surface of the glass for larger alkali ions (or other larger exchangeable ions), the chemical exchange being to a depth of at least 40 μm from the surface of the sheet; and finishing the sheet by cutting and polishing as required (including and edge cutting, grinding and polishing) to make the glass article;

wherein when finished, the glass article has a damage tolerance threshold of at least 2000 g as measured by the lack of the presence of radial cracks when the load is applied to the glass using a Vickers indenter.

DETAILED DESCRIPTION

Figure 1:
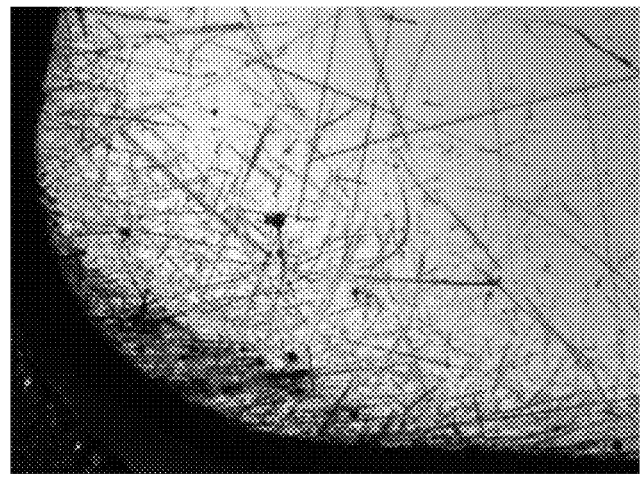
FIG. 1 illustrates a commercially used glass material and the scratches present on the glass from use.
Figure 2:
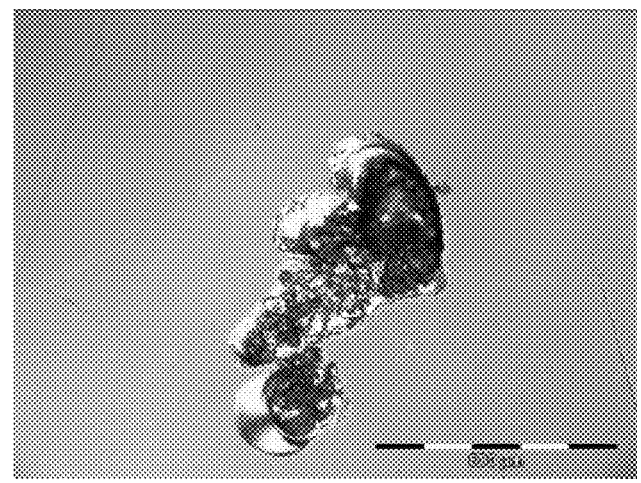
FIG. 2 illustrates a commercially used glass material and the damage that can occurred to the glass upon contact sharp contact or impact with an object.
Figure 3:
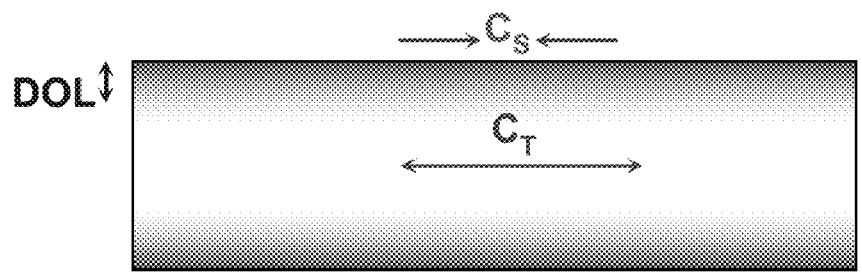
FIG. 3 is a schematic diagram illustrating a glass with an ion-exchanged layer of depth DOL, surface compressive stress $C_S$ and central tension $C_T$.

As used herein, the terms "chemical strengthening," "chemical toughening" and "ion-exchanging", and similar terms, mean exchanging alkali ions in a glass composition with larger diameter alkali ions. All glass compositions given herein are for glass before any ion exchange. Also herein, it is to be understood that the glass article being claimed can be both protective and/or interactive, for example, a touch screen. As used in FIGS. 8-11, the arrow 200 indicates the scratch direction. As may be used herein regarding glass compositions, the term "consisting essentially of" means that the composition contains the recited materials and amounts, and excludes contaminants that may be present in the glass In general what is disclosed is a thin protective cover glass that has been chemically strengthened to have a high damage threshold of at least 2000 g as measured by the lack of the presence of radial cracks when the load is applied to the glass by a Vickers indenter. While the invention can be used to make cover glasses of any thickness (for example, 30 mm), cover glasses for use in electronic devices, and particularly hand-held devices, have to be thin for weight reasons and generally have a thickness of less than or equal to 5.0 mm; preferably less than or equal to 2.0 mm; in some embodiments less than 1.7 mm; and in additional embodiments less than 1.2 mm. The difficulty with the thin cover glasses is that while being thin, the glass must be capable of withstanding an abrasive in-service environment and also be resistant to cracking, peeling and other types of damage. As mobile display manufacturers transition existing and future products from plastic display covers to glass coves, glass will be exposed to ever increasing levels of abuse. Examples of scratch and impact damage on a commercial ion-exchanged sodium aluminosilicate glass used in presently available cell phones are shown in FIGS. 1 and 2. FIG. 1 illustrates the scratches on the protective glass cover that occur through ordinary use. FIG. 2 illustrates the damage that can occur to the same glass upon contact sharp contact or impact with an object. The same type of glass is used in other electronic devices.

The invention, in one aspect, is directed to a thin, ion-exchanged (chemically toughened) cover glass optimized so that it is resistant to damage and failure when used in mobile (or non mobile) display devices. The performance of this glass is described in terms of tests (pre-existing or developed) specifically designed to quantify damage tolerance and failure resistance. The compression layer of the glass of the invention has been optimized to be at least 40 μm in depth, which is deeper than other ion-exchanged cover glass used in these devices, and has a compressive stress of at least 600 MPa; preferably a compressive stress of at least 700 MPa. It is this combination of depth of layer (DOL) and compressive stress (CS) that provides the superior resistance to crack initiation and failure.

Figure 12:
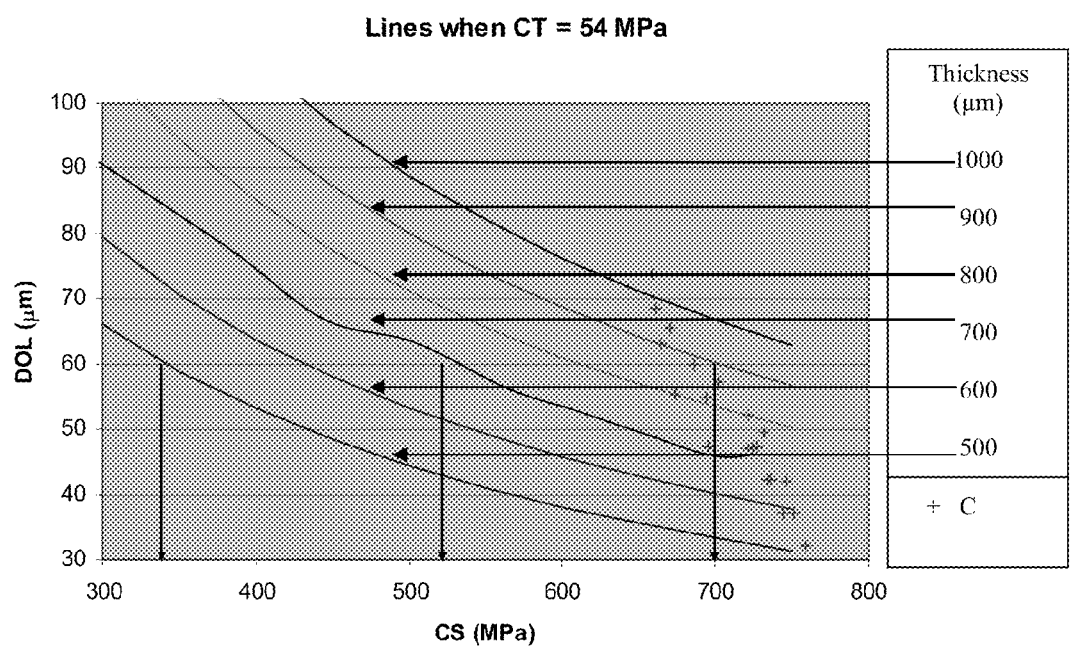
FIG. 12 is a graph illustrating the relationship between DOL and CS for glasses of varying thickness (generally) and for glass of the invention.

When the limit of maximum tensile strength is imposed on thin glass articles, the CS and DOL will have to be limited. This limit can be reached by achieving the maximum CS while controlling the depth of the compression layer or it can be controlled by achieving a desired DOL while limiting the maximum CS. The DOL can be limited by controlling the time while the CS can be limited by controlling the concentration of sodium ions on the ion exchange bath. The limit of maximum tensile stresses for glass articles of various thicknesses (500 to 1000 μm) is shown in FIG. 12 and the lines drawn for each thickness are for when CT (tension in the center) is 54 MPa. In FIG. 12 the "+" data points indicate the DOL/CS relationship for chemically strengthened sodium aluminosilicate glass ("C" in FIG. 12 legend) according to the invention. The CS/DOL values to the left of the + data points can be achieved by dilution of the ion-exchange bath.

Figure 13:
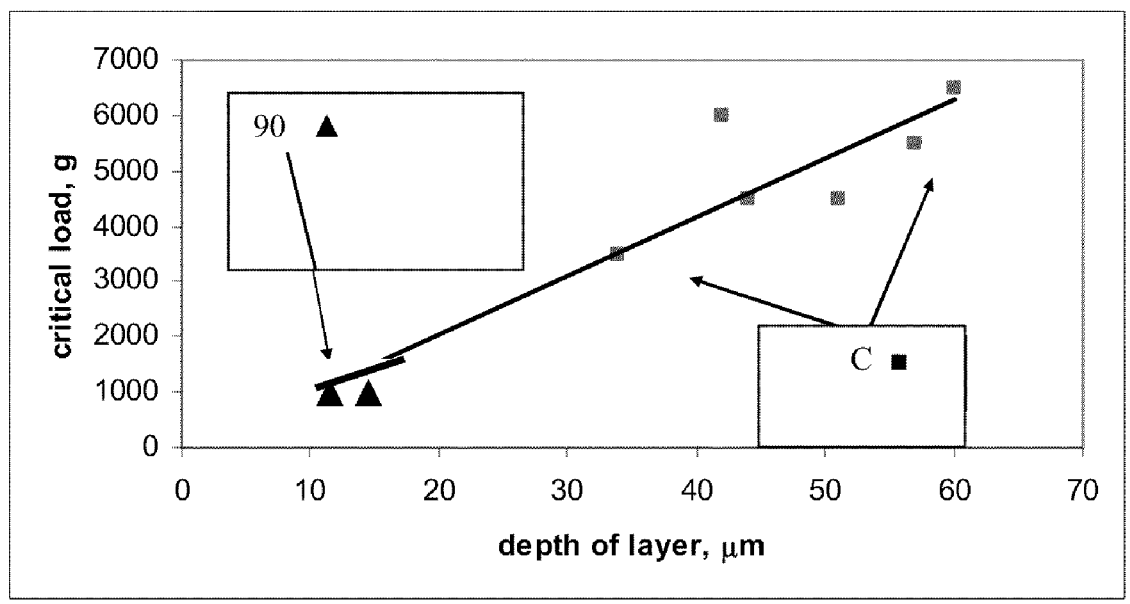
FIG. 13 is a graph illustrating the Critical Load vs. Depth of layer (DOL) for chemically strengthened soda-lime glass presently used as a protective glass and glasses of the invention.

If a DOL of 60 μm is desired, the maximum compressive stress that can be developed in the surface of the glass article is 330, 520 and 700 MPa for 0.5, 0.7 and 0.9 mm articles, respectively. If a specified impact resistance is required, it is generally desirable to target a depth of layer while limiting the surface compressive stress. The impact load is related to the dept of layer as is illustrated in FIG. 13. In FIG. 13 the ▲90 represent results obtained with a chemically strengthened soda lime glass as is now commercially used and the symbol ■C represents results obtained using the chemically strengthened sodium aluminosilicate glass according to the invention.

The net result is that the chemical strengthening parameters for thin glass can be controlled to achieve a desired level of damage resistance.

From a frangibility viewpoint, it has been found desirable that the level of tensile stress in the center of a glass of approximately 1 mm thickness should be below approximately 54 MPa as calculated from the CS and DOL measurements with FSM-6000 surface stress meter. This MPa value will vary with the thickness of the glass, the MPa value rising as the glass gets thinner and falling as the glass gets thicker.

As will be shown by the data presented herein, the chemically toughened (strengthened) glasses of the invention have a number of improved and highly desirable characteristics. Among these are:

1. Greater resistance to surface chipping from a sharp object striking the glass surface than other glass that glass presently used in these devices.
2. Greater resistance to the initiation of strength limiting flaws, flaws proven to be present in existing devices with a cover glass.
3. Machining and handling flaws induced prior to ion exchange are enveloped by the exchanged layer and placed in compression. This makes the final glass product more tolerant to the finishing process.
4. Reduced finishing costs as glass surface can be formed directly during glass making using the fusion process The invention can be practiced with glass compositions that can be chemically strengthened (that is, contains an element or elements in the glass can be ion-exchanged). Glasses that are particularly suited to the invention are alkali containing aluminosilicate glasses, alkali containing borosilicate glasses, alkali containing aluminoborosilicate glasses and alkali contain glass-ceramics. In preferred embodiments the glasses and glass-ceramics are transparent. The glass can be chemically strengthened by ion exchange and the compositions can be down-drawn into sheets. The glass has a melting temperature of less than about 1650° C. and a liquidus viscosity of at least 130 kpoise and, in one embodiment, greater than 250 kpoise. The glass can be ion exchanged at relatively low temperatures and to a depth of at least 30 μm.

One exemplary sodium aluminosilicate glass has, before ion exchange, a composition of 64 mol %$\leq SiO_2 \leq$68 mol %; 12 mol %$\leq Na_2O \leq$16 mol %; 8 mol %$\leq Al_2O_3 \leq$12 mol %; 0 mol %$\leq B_2O_3 \leq$3 mol %; 2 mol %$\leq K_2O \leq$5 mol %; 4 mol %$\leq MgO \leq$6 mol %; and 0 mol %$\leq CaO \leq$5 mol %, 0-0.5% $(As_2O_3, SnO_2)$; wherein: 66 mol %$\leq SiO_2+B_2O_3+CaO \leq$69 mol %; $Na_2O+K_2O+B_2O_3+MgO+CaO+SrO>$10 mol %; 5 mol %$\leq MgO+CaO+SrO \leq$8 mol %; $(Na_2O+B_2O_3)-Al_2O_3 \leq$2 mol %; 2 mol %$\leq Na_2O-Al_2O_3 \leq$6 mol %; and 4 mol %$\leq (Na_2O+K_2O)-Al_2O_3 \leq$10 mol %.

Other exemplary sodium aluminosilicate glasses have a composition, in weight percent before ion exchange, of 64-68% $SiO_2$, 10-12% $Al_2O_3$, 0-2% $B_2O_3$, 12-15% $Na_2O$, 2-4% $K_2O$, 5-7% MgO, >0-1% CaO, 0-0.5% $(As_2O_3,SnO_2)$, 0-1% $(Sb_2O_3,SnO_2)$, and 0-1% $TiO_2$. The arsenic and antimony are frequently added to glass compositions as fining agents to aid in eliminating gaseous inclusions in the glass. However, arsenic and antimony are generally regarded as hazardous materials. Accordingly, in one embodiment, the glass is substantially free of antimony and arsenic, comprising less that about 0.05 wt % of each of the oxides of these elements. In applications where a fining agent may be necessary it is advantageous to use a nontoxic component such as tin, halides, or sulfates to produce the fining effect. Tin (IV) oxide ($SnO_2$) and combinations of tin (IV) oxide and halides are particularly useful as fining agents and can be used to replace the arsenic and antimony in the foregoing compositions.

The glass composition to be used for making the chemically toughened glass of the invention can be made into sheets using suitable processes; for example, fusion drawing, slot draw, rolled sheet, precision pressing and other methods known in the art. The preferred methods are draw-down methods such as fusion drawing and slot drawing because they result in a glass with a relatively pristine surface. These draw-down methods are used in the large-scale manufacture of ion-exchangeable flat glass.

The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet therethrough and into an annealing region. Compared to the fusion draw process, the slot draw process provides a thinner sheet as only a single sheet is drawn through the slot, rather than two sheets being fused together, as in the fusion down-draw process.

In order to be compatible with down-draw processes, the alkali aluminosilicate glass described herein has a high liquidus viscosity. In one embodiment, the liquidus viscosity is at least 130 kilopoise (kpoise) and, in another embodiment, the liquidus viscosity is at least 250 kpoise.

In one embodiment, the glass is strengthened by ion-exchange. As used herein, the term "ion-exchanged" is understood to mean that the glass is strengthened by ion-exchange processes that are known to those skilled in the glass fabrication arts. Such ion exchange processes include, but are not limited to, treating the heated alkali aluminosilicate glass (or other suitable alkali-containing glass) with a heated solution containing ions having a larger ionic radius than ions that are present in the glass surface, thus replacing the smaller ions with the larger ions. Potassium ions, for example, could replace sodium or lithium ions in the glass. Alternatively, other alkali metal ions having larger atomic radii, such as rubidium (Rb) or cesium (Cs) could replace smaller alkali metal ions in the glass, including potassium. Similarly, other alkali metal salts such as, but not limited to, sulfates, halides, and the like may be used in the ion exchange process. Generally the times and temperatures for ion-exchange are 380-460° C. and 3-16 hours, respectively, for when using the compositions described herein using a 100% potassium nitrate bath. The exact time and temperature required are dependent of the exact glass composition being ion-exchanged. In one embodiment, the down-drawn glass is chemically strengthened by placing it a molten salt bath comprising $KNO_3$ for a predetermined time period to achieve ion exchange. In one embodiment, the temperature of the molten salt bath is about 430° C. and the predetermined time period is about eight hours. In another embodiment the ion-exchange is first carried out using K ion to achieve the desired depth of exchange and then carried out using Ce or Rb ion to further strengthen the surface by exchange with K ions relative close to the surface.

Down-draw processes produce surfaces that are relatively pristine. Because the strength of the glass surface is controlled by the amount and size of surface flaws, a pristine surface that has had minimal contact has a higher initial strength. When this high strength glass is then chemically strengthened, the resultant strength is higher than that of a surface that has been a lapped and polished. Chemical strengthening or tempering by ion exchange also increases the resistance of the glass to flaw formation due to handling. Accordingly, in one embodiment, the down-drawn alkali aluminosilicate glass has a warpage of less than about 0.5 mm for a 300 mm×400 mm sheet. In another embodiment, the warpage is less than about 0.3 mm.

Surface compressive stress refers to a stress caused by the substitution during chemical strengthening of an alkali metal ion contained in a glass surface layer by an alkali metal ion having a larger ionic radius. In one embodiment potassium ions are substituted for sodium ions in the surface layer of the glass described herein. The glass has a surface compressive stress of at least about 200 MPa. In one embodiment, the surface compressive stress is at least about 600 MPa. In a further embodiment the surface compressive strength is at least 700 MPa. The alkali aluminosilicate glass has a compressive stress layer that has a depth of at least 40 μm.

The replacement of smaller ions by larger ions at a temperature below that at which the glass network can relax produces a distribution of ions across the surface of the glass that results in a stress profile. The larger volume of the incoming ion produces compressive stress (CS) on the surface and tension in the center (CT) of the glass. The compressive stress is related to the central tension by the following relationship:

$$CS=CT \times (t-2DOL)/DOL$$

where t is the thickness of the glass and DOL is the depth of exchange.

To exemplify the invention, a sodium aluminosilicate glass composition which falls within the composition as described above, and repeated below, was fusion drawn into sheets. Sample "C" was comprised of the following analyzed composition, in mol %: 67% $SiO_2$, 10% $Al_2O_3$, 0.45% $B_2O_3$, 13.6% $Na_2O$, 2.6% $K_2O$, 5.8% MgO, 0.06%, CaO and 0.33% $As_2O_3$. This Sample C was evaluated along with three non-Corning commercially available soda lime glasses and identified below as Samples "X", "Y", and "Z" which are advertised as being chemically strengthenable (that is, they are not chemically strengthened as received but can be chemically strengthened by the purchaser). All four samples were ion-exchanged under the same conditions, exchanging K ions for Na ions. All glass samples were 1 mm thick. All glass samples were optimized for ion exchange. Table 1 shows the depth of ion-exchange for the four samples

TABLE 1

|  | X | Y | Z | C |
|---|---|---|---|---|
| DOL μm) | 15 | 14 | 12 | 63 |
| CS (MPa) | 532 | 500 | 768 | 708 |
| Temp., ° C. | 390 | 430 | 410 | 410 |
| Time (Hr) | 12 | 7 | 11 | 12 |

X and Y are soda lime glasses containing 1-2 wt % alumina.
Z is a soda lime glass containing about 3 wt % alumina
C is a sodium aluminosilicate glass containing 8-10 wt % alumina.

Table 1 illustrates that using the glasses described herein, one is able to obtain a chemically strengthen glass that has a depth of layer DOL (which is the depth to which K ions are exchanged for Na ions) of greater than 40 μm and a surface compressive stress CS greater than 600 MPa; preferably greater than 700 MPa.

As indicted above, all glass samples were ion-exchanged by the same process. Consequently, the samples can be directly compared for resistance to glass damage after ion exchange, which comparison is illustrated in FIGS. 4-7. Generally, flaws after finishing are better contained within the ion-exchange layer as is evidenced by the increase in strength after ion exchange.

Figure 4:
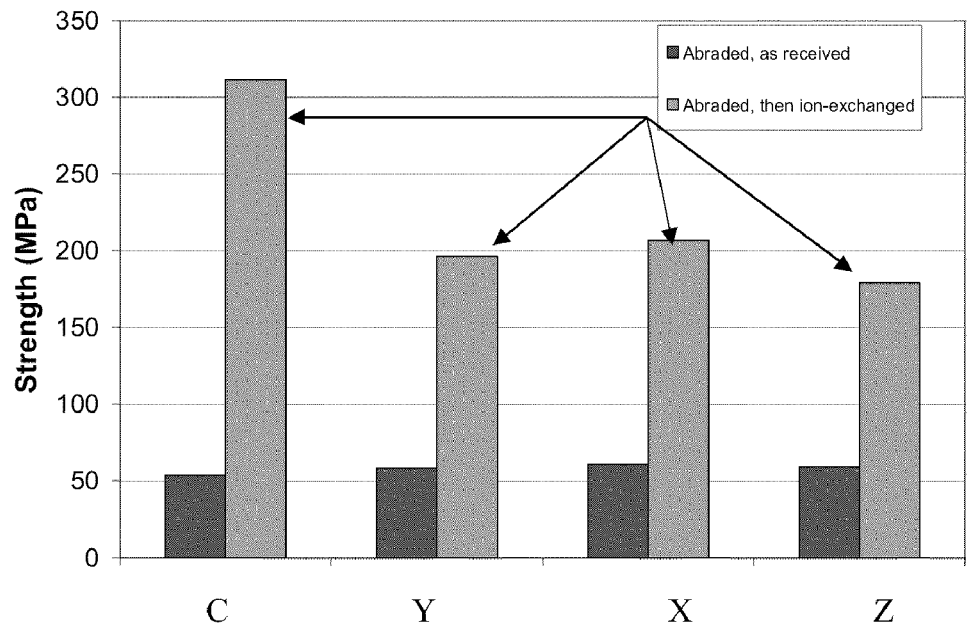
FIG. 4 is a graph showing the strength of selected glass materials before and after ion exchange.
Figure 5:
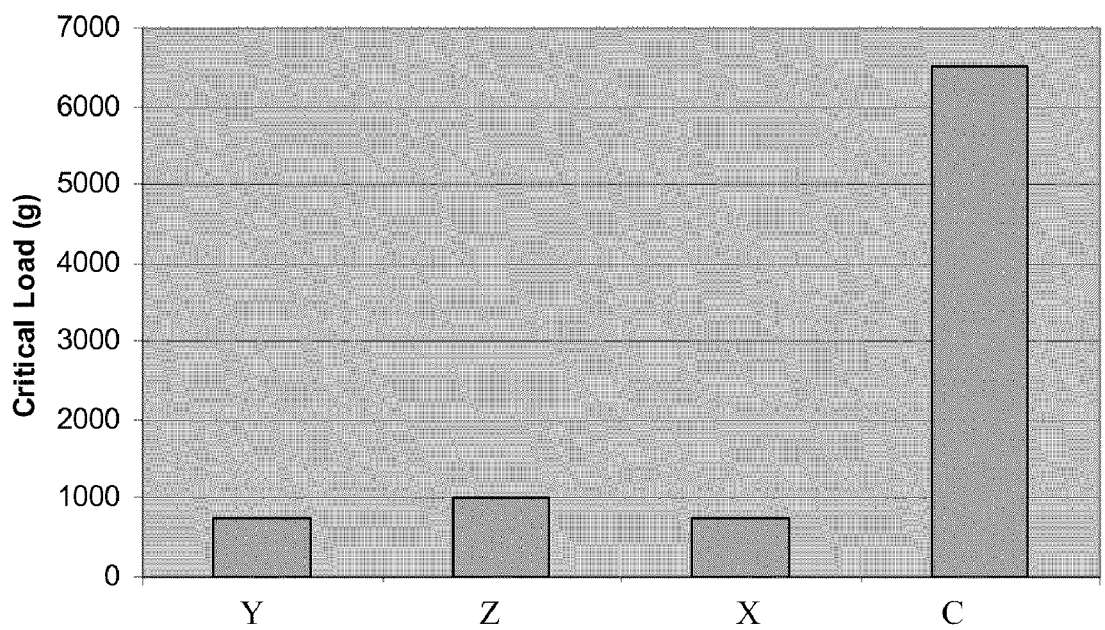
FIG. 5 is a graph illustrating the onset of strength limiting radial cracks as measured by the Vickers indentation method.

In FIGS. 4-7 both ion-exchanged and non-ion-exchanged samples of each of X, Y, Z and C were evaluated. The non-ion-exchanges samples were all abraded to the same 50 MPa strength level and then ion-exchanged. FIG. 4 illustrates that all samples had the same strength before ion-exchange, Sample C was approximately 100 MPa stronger than Samples X, Y and Z after abrasion, but before ion exchange FIG. 5 illustrates the onset of strength limiting cracks as measured by the Vickers indentation method all have the same approach for each of the four samples. Samples X, Y and Z all exhibit the onset of radial cracks at a critical load in the range of 800-1000 g. Sample C did not exhibit radial cracking until a critical load was greater than 6000 g. The critical load of Sample C was thus at least 6× greater than the load of the other samples.

Figure 6:
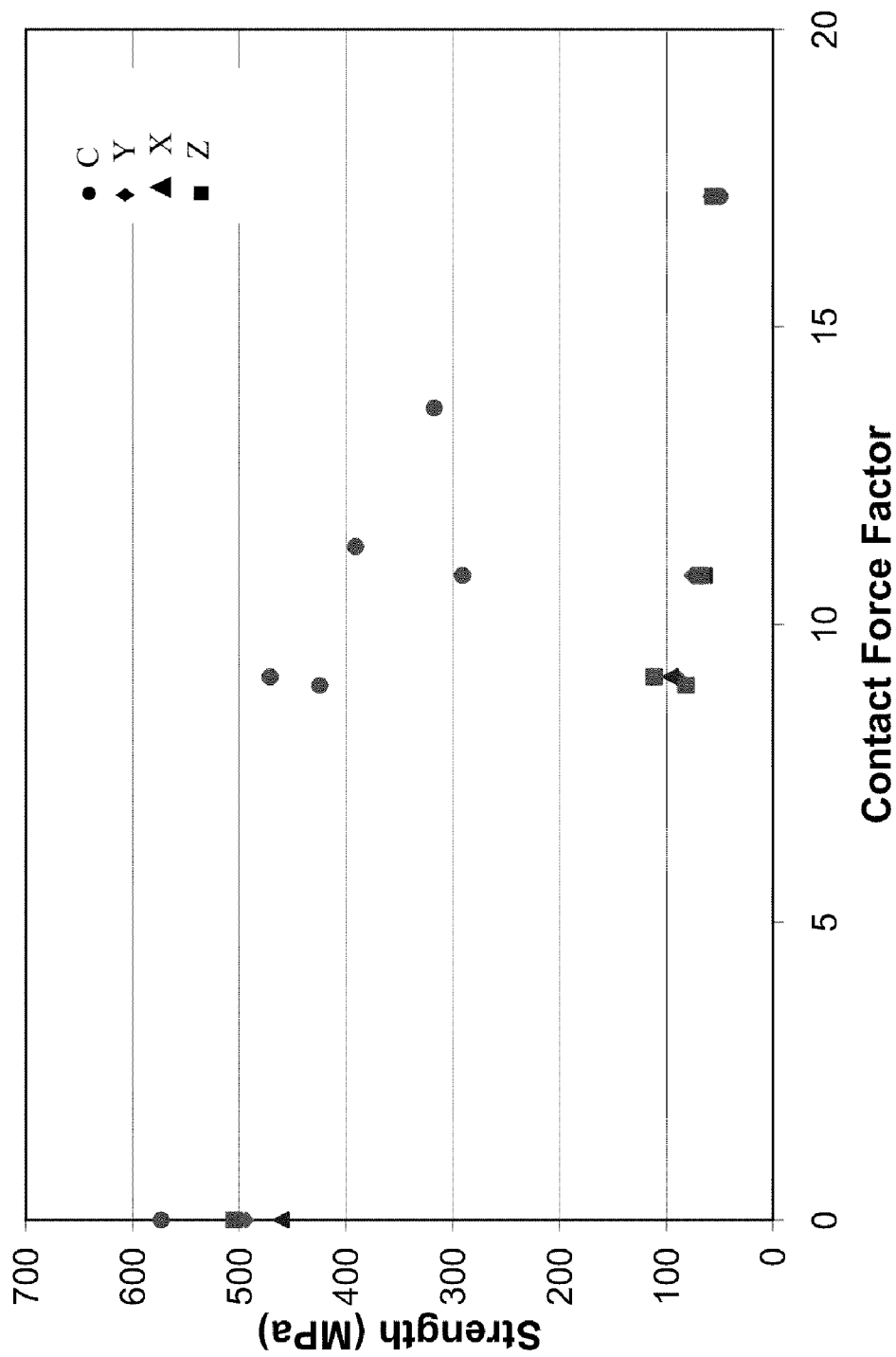
FIG. 6 is a graph illustrating the strength of selected ion-exchanged glasses after abrasion by air blasting using SiC particles.

FIG. 6 illustrates the strength of ion-exchanges Samples X, Y, Z and C after blasting with sharp, hard SiC particles according to ASTM Method C158. The x-axis, labeled "Contact Force Factor" or "CFF", is a combination of grit size and blasting pressure. The blasted SiC particles abrade the glass surface. The strength of the glass after SiC blasting was measured using the ring-on ring method. The results shown in FIG. 6 shown that Samples X, Y and Z all have an initial strength (in MPa) of between 450 and 500, whereas Sample C has an initial strength of approximately 575 MPa. After SiC blasting at a CFF of approximately 10, Samples X, Y and X all shown a strength in the range of 80-100 MPa whereas Sample C showed an average strength of approximately 400 MPa.

Figure 7:
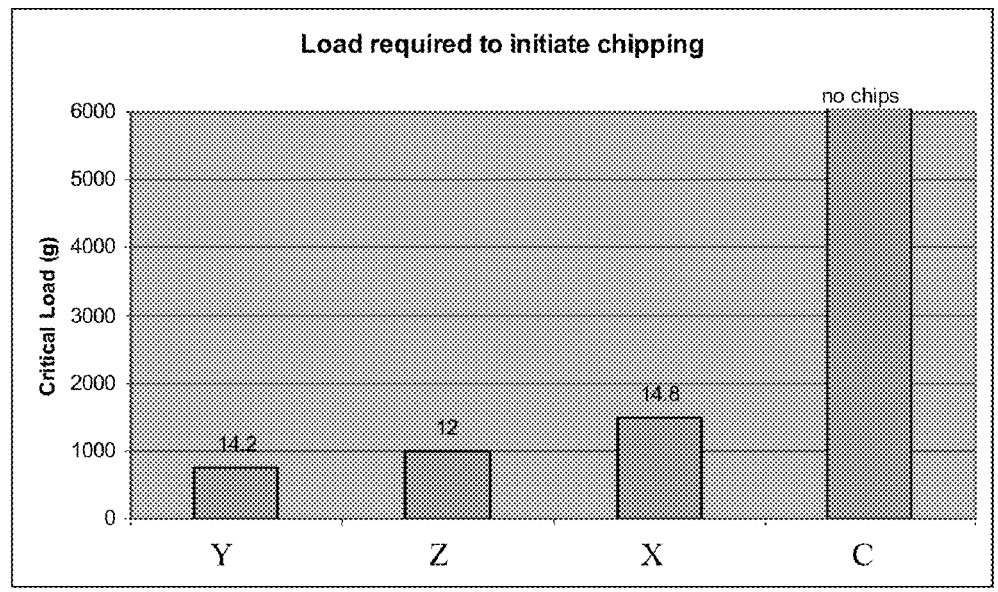
FIG. 7 is a graph illustrating lateral crack initiation threshold (visual defects) as measured using a Vickers indent

FIG. 7 illustrates the load that was required to initiate lateral cracking which is responsible for chipping. The lateral crack threshold (visible defects) was measured using a Vickers indenter. [There is no ASTM method for the Vickers indenter test, but the method is described in articles by T. Tandon et al., "Stress Effects in Indentation Fracture Sequences," J. Am. Ceram Soc. 73 [9] 2619-2627 (1990); R. Tandon et al., *Indentation Behavior of Ion-Exchanges Glasses,*" J. Am. Ceram Soc. 73 [4] 970-077 (1990); and P. H. Kobrin et al., *"The Effects of Thin Compressive Films on Indentation Fracture Toughness Measurements,"* J. Mater. Sci. 24 [4] 1363-1367 (1989)]. The numbers above each bar represent the depth of the ion-exchanged layer of each sample and are also found in Table 1. The results illustrated in FIG. 7 shown that the Critical Load required to initiate cracking and chipping of Samples X, Y and Z is in the approximate range of 800-1400 g, where for Sample C no lateral cracking, and hence no chip formation, was observed at loads as high as 6000 g. The results indicate that Sample C is at least 4× more resistant to lateral cracking than Samples X, Y and Z.

Figure 8:
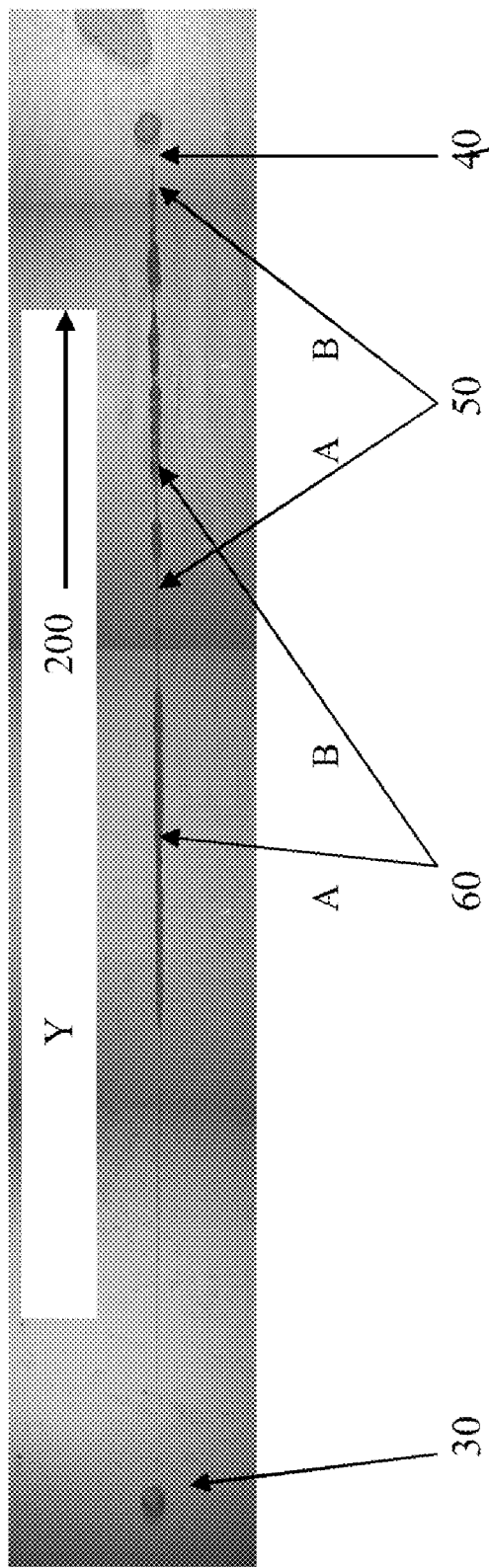
FIG. 8 illustrates the scratch damage induced by sliding a Knoop diamond indenter across the surface of a commercially available cover glass
Figure 9:
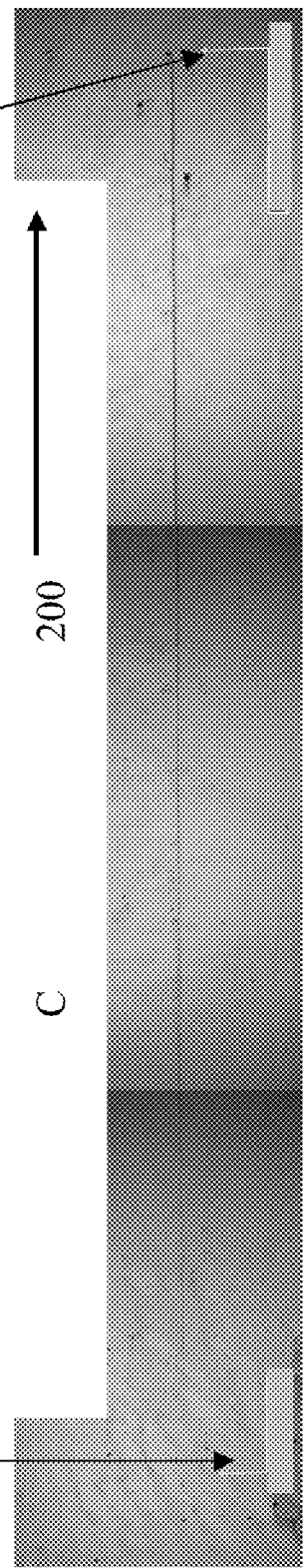
FIG. 9 illustrates the scratch damage induced by sliding a Knoop diamond indenter across the surface of a cover glass chemically strengthened according to the invention.

FIGS. 8 and 9 illustrate in improves resistance of the glass of the present invention over a commercially available glass used as a protective cover glass. The test was conducted using ASTM G171-03 scratch test method and the Micro-Tribometer mod.UMT-2. The UMT is a commercial instrument (CETR Inc., Campbell, Calif.) that permits various form of tribological testing including scratch tests. An appropriate reference is V. Le Houerou et al., "*Surface Damage of Soda-lime-silica Glasses: Indentation Scratch Behavior,*" J. Non-Cryst Solids, 316 [1] 54-63 (2003). In this test a Knoop indenter is dragged across the surface with an ever increasing indentation load to a maximum load of 500 grams in approximately 100 seconds (so as to distinguish glass-to-glass differences).

Figure 10:
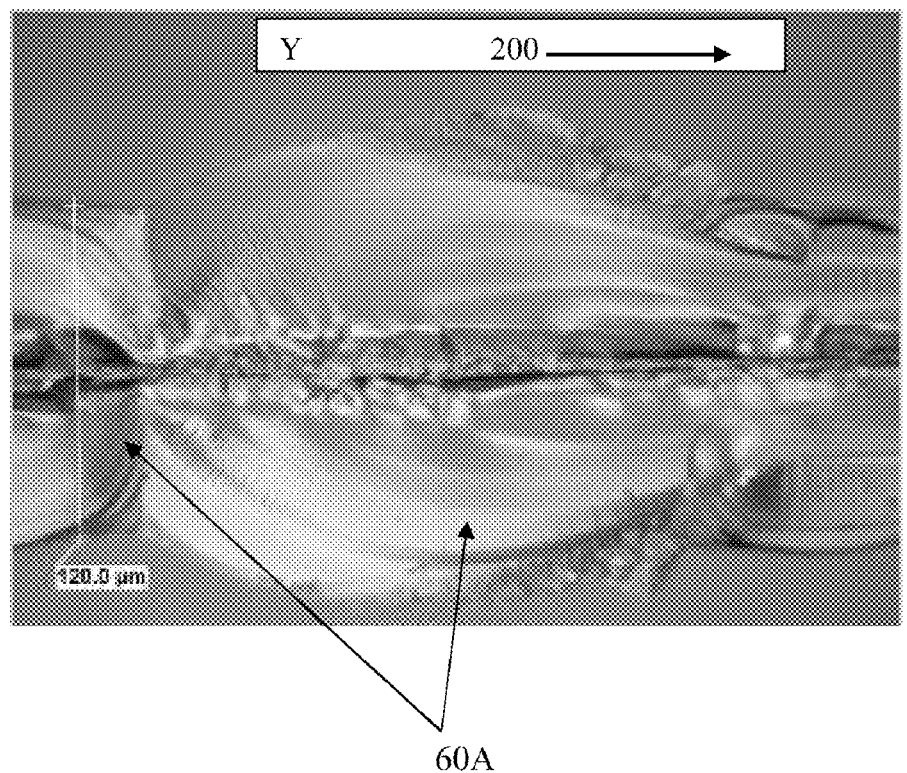
FIG. 10 is an enlargement of the area indicated by arrow 60A and illustrates the chipping that occurs in the commercial glass.
Figure 11:
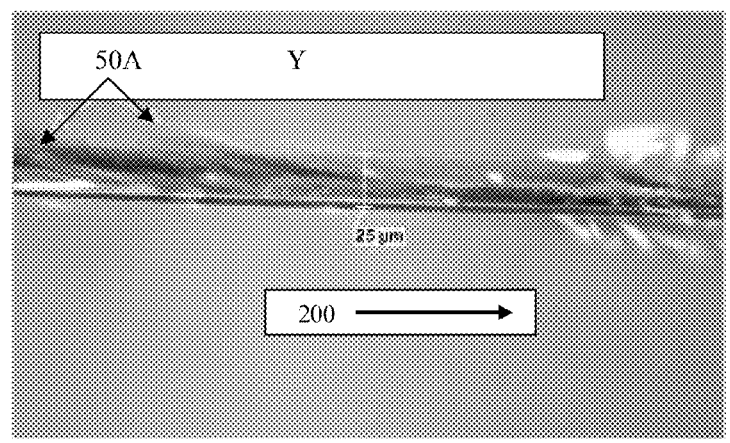
FIG. 11 is an enlargement of the area indicated by arrow 50A and illustrates the lateral cracks that occur in the commercial glass.

FIGS. 8 and 9 illustrate the scratch induced by sliding a Knoop diamond indenter across the surface of glass Sample Y and C, respectively, at an ever increasing load. Numerals 30 and 40 represent the start and finish point of the scratch test for each sample. For both Samples Y and C there was grooving and pealing of glass from the indenter groove as might be expected. However, in Sample Y are three stages of damage which are the scratch groove, lateral cracking (numeral 50, lines A and B) and chipping (numeral 60, lines A and B). The lateral cracking and chipping of Sample Y occurs at a load of less than 200 grams. Median crack vents are also generated. There is no evidence of lateral cracking or chipping in Sample C, which shows only the scratch groove. The Sample C glass article does not exhibit lateral cracking until loads exceeding 500 grams in this test. FIG. 10 is an enlargement of the area of Sample Y denoted by arrow 60A in FIG. 8 and illustrates the chipping that occurred at that point for this sample. Similar chipping can be found in Sample Y in the area denoted by arrow 60B and elsewhere along the groove. FIG. 11 is an enlargement of the Sample Y area denoted by arrow 50A in FIG. 8 and illustrates the lateral cracks found in Sample Y. Similar lateral cracks can be found elsewhere in Sample Y along the groove line.

Unlike float glass, which has been used to make cover glasses, fusion formed and slot drawn glass does not have to be thinned during finishing. Once the edges are prepared, the glass is ready for product assembly. This lowers the cost of manufacturing the cover glass, especially for devices requiring large glass surface areas, for example, ATM touch screens, laptop computers and other large screen devices. The beneficial surface forming surface area forming can also impact manufacturing process step utilization. Equipments investments and process time can be devoted to edge grinding operations which in turn can permit more rigorous process control and hence improved strength of the ground edge, an area that often is the first to fail.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

We claim:

1. A high strength, chemically toughened protective glass article, said protective glass article having a thickness less than or equal to 2.0 millimeters, a surface chemically toughed to a depth of at least 40 µm, and a high damage tolerance threshold of at least 1500 g as measured by the lack of the presence of radial cracks when the load is applied to the glass using a Vickers indenter and wherein the composition of the glass of said article comprising, before any ion exchange to chemically strengthen, 64 mol %$\leq SiO_2 \leq$68 mol %; 12 mol %$\leq Na_2O \leq$16 mol %; 8 mol %$\leq Al_2O_3 \leq$12 mol %; 0 mol %$\leq B_2O_3 \leq$3 mol %; 2 mol %$\leq K_2O \leq$5 mol %; 4 mol %$\leq MgO \leq$6 mol %; and 0 mol %$\leq CaO \leq$5 mol %; 0-0.5% ($As_2O_3$, $SnO_2$); wherein: 66 mol %$\leq SiO_2+B_2O_3+CaO \leq$69 mol %; $Na_2O+K_2O+B_2O_3+MgO+CaO+SrO>$10 mol %; 5 mol %$\leq MgO+CaO+SrO \leq$8 mol %; ($Na_2O+B_2O_3$)—$Al_2O_3 \leq$2 mol %; 2 mol %$\leq Na_2O$—$Al_2O_3 \leq$6 mol %; and 4 mol %$\leq (Na_2O+K_2O)$—$Al_2O_3 \leq$10 mol %.

2. The glass article according to claim 1 having a damage tolerance threshold of at least 4000 g as measured by the lack of the presence of radial cracks when the load is applied to the glass using a Vickers indenter.

3. The glass article according to claim 1 having a damage tolerance threshold of at least 6000 g as measured by the lack of the presence of radial cracks when the load is applied to the glass using a Vickers indenter.

4. The glass article according to claim 1, wherein the glass of said protective article is selected from the group consisting of alkali containing aluminosilicate glasses, alkali containing aluminoborosilicate glasses, alkali containing borosilicate glasses and alkali containing glass-ceramics.

5. The glass article according to claim 1, wherein the composition of the glass of said article comprising, before any ion exchange to chemically strengthen, 64-68% $SiO_2$, 10-12% $Al_2O_3$, 0-2% $B_2O_3$, 12-15% $Na_2O$, 2-4% $K_2O$, 5-7% MgO, >0-1% CaO, 0-0.5% ($As_2O_3$, $SnO_2$), 0-1% ($Sb_2O_3$, $SnO_2$), and >0-1% $TiO_2$.

6. The article according to claim 1, wherein said article has a strength after chemical toughening of at least 250 MPa.

7. The article according to claim 1, wherein said article has a strength of 200 MPa or greater after blasting the surface of said article with SiC grit according to ASTM Method C158.

8. The article according to claim 1, wherein said article has a strength of 300 MPa or greater after blasting the surface of said article with SiC grit according to ASTM Method C158.

9. The article according to claim 1, wherein the surface of said article has a surface compressive stress greater than 600 MPa.

10. A high strength, chemically toughened protective cover glass article, said cover glass article having a thickness of less than 1.7 millimeters and having been chemically toughened to provide a surface compression layer of a depth (DOL) of at least 40 µm, the level of surface compression (CS) in the article being limited such that the article exhibits a level of central tension (CT) not exceeding 54 MPa at a thickness of 1.0 mm, and the article exhibiting a high damage tolerance threshold load of at least 2000 g as measured by the absence of radial cracking when the load is applied to the glass using a Vickers indenter and wherein the composition of the glass of said article comprising, before any ion exchange to chemically strengthen, 64 mol %$\leq SiO_2 \leq$68 mol %; 12 mol %$\leq Na_2O \leq$16 mol %; 8 mol %$\leq Al_2O_3 \leq$12 mol %; 0 mol %$\leq B_2O_3 \leq$3 mol %; 2 mol %$\leq K_2O \leq$5 mol %; 4 mol %$\leq MgO \leq$6 mol %; and 0 mol %$\leq CaO \leq$5 mol %; 0-0.5% ($As_2O_3$, $SnO_2$); wherein: 66 mol %$\leq SiO_2+B_2O_3+CaO \leq$69 mol %; $Na_2O+K_2O+B_2O_3+MgO+CaO+SrO>$10 mol %; 5 mol %$\leq MgO+CaO+SrO \leq$8 mol %; ($Na_2O+B_2O_3$)—$Al_2O_3 \leq$2 mol %; 2 mol %$\leq Na_2O$—$Al_2O_3 \leq$6 mol %; and 4 mol %$\leq (Na_2O+K_2O)$—$Al_2O_3 \leq$10 mol %.

* * * * *